United States Patent [19]

Varadaraj

[11] Patent Number: 5,614,474
[45] Date of Patent: Mar. 25, 1997

[54] POLYMER-SURFACTANT FLUIDS FOR DECONTAMINATION OF EARTH FORMATIONS

[75] Inventor: Ramesh Varadaraj, Flemington, N.J.

[73] Assignee: Exxon Research and Engineering Company, Florham Park, N.J.

[21] Appl. No.: 324,546

[22] Filed: Oct. 18, 1994

[51] Int. Cl.$^6$ .............. C09K 7/02; B01F 17/02; B01F 17/00
[52] U.S. Cl. .......... 507/225; 507/927; 507/929; 252/353; 252/355; 252/357
[58] Field of Search .................. 507/927, 929, 507/245, 244, 225; 252/353, DIG. 2, DIG. 14, 355, 357

[56] References Cited

U.S. PATENT DOCUMENTS

| | | |
|---|---|---|
| 4,401,569 | 8/1983 | Jhaveri et al. . |
| 4,591,443 | 5/1986 | Brown et al. . |
| 4,730,028 | 3/1988 | Bock et al. . |
| 4,734,205 | 3/1988 | Jacques et al. . |
| 4,997,878 | 3/1991 | Bock et al. . |
| 5,003,000 | 3/1991 | Bock et al. . |
| 5,008,019 | 4/1991 | Trost . |
| 5,089,578 | 2/1992 | Valint et al. . |

*Primary Examiner*—Philip Tucker
*Attorney, Agent, or Firm*—Joseph J. Dvorak

[57] ABSTRACT

The present invention provides a composition for in-situ decontamination of earth formations comprising:

(a) from about 1,000 to about 25,000 parts by weight of a hydrophobically associating polymer per million parts by weight of water;

(b) from about 25 to about 7,500 parts by weight per million parts by weight of water of one or more anionic or non-ionic surfactants; and, (c) from about 0.5 wt % to about 4 wt %, based on the weight of water, of salts selected from the group consisting of alkali and alkaline earth metal halides and mixtures thereof.

4 Claims, No Drawings

5,614,474

POLYMER-SURFACTANT FLUIDS FOR DECONTAMINATION OF EARTH FORMATIONS

FIELD OF THE INVENTION

The present invention relates to compositions for use in in-situ soil decontamination of earth formations.

BACKGROUND OF THE INVENTION

There are a variety of techniques that had been proposed for decontaminating a hydrocarbon contaminated, permeable subterranean earth formation. One technique, for example, for treating such an earth formation is to flood the formation with dilute solution of a surfactant. This technique is known as surfactant flooding. Surfactant flooding, however, suffers from the disadvantage that the surfactant fluid either "fingers" through or "by-passes" the contaminant limiting the effectiveness of the process.

U.S. Pat. No. 5,008,019 discloses the use of a polymer in an aqueous flooding solution to control the mobility of the solution injected into an earth formation. The amount of mobility control provided by typical aqueous polymer solutions, however, tends to be very limited because, the range of viscosity that can be achieved by adding a polymer to an aqueous solution generally is relatively narrow. In theory, the efficiency of surfactant flooding processes would be increased if the viscosity of the surfactant fluid is at least substantially equal to or greater than that of the viscosity of the contaminant trapped in the formation.

It is an aim of the present invention, therefore, to improve surfactant flooding processes by providing an aqueous solution of a polymer and one or more surfactants in which the polymers and surfactants are capable of being combined in various concentrations that will provide a wide range of viscosities thereby permitting closer tailoring of the viscosity of the surfactant solution for the hydrocarbon contaminated earthen formation to be decontaminated by flooding.

SUMMARY OF THE INVENTION

In its simplest sense, the present invention provides a composition for in-situ decontamination of earth formations comprising:

(a) from about 1,000 to about 25,000 parts by weight of a hydrophobically associating polymer per million parts by weight of water;

(b) from about 25 to about 7,500 parts by weight per million parts by weight of water of one or more anionic or non-ionic surfactants; and, (c) from about 0.5 wt % to about 4 wt %, based on the weight of water, of salts selected from the group consisting of alkali and alkaline earth metal halides and mixtures thereof.

DESCRIPTION OF THE INVENTION

Compositions useful in the in-situ decontamination of hydrocarbon contaminated earth formations having a wide range of viscosities, for example, viscosities ranging from about 20 to about 2,500 centipoise are prepared by combining a hydrophobically associating polymer and one or more anionic or non-ionic surfactants in an aqueous salt solution.

The hydrophobically associating polymers suitable in the practice of the present invention include copolymers of mono or dialkyl acrylamides with acrylamide, their partially hydrolyzed derivatives, and terpolymers of mono and dialkyl acrylamides, acrylamides and one of an ethylenically unsaturated sulfonic acid salt of an alkali metal or ammonia, and/or N-vinyl pyrrolidone. The alkyl groups of the mono and dialkylacrylamides will typically be in the range of about 4 to 18 carbons and preferably will be in the range from about 6 to 12. The mol % of the alkyl group in the polymer will typically be in the range of about 0.1 to 4.0 and preferably will be in the range from about 0.2 to 1.5.

A particularly preferred hydrophobically associating polymer used in the practice of the present invention is a copolymer of acrylamide and n-octylacrylamide which has been partially hydrolyzed to form a polymer containing from about 10 mol % to about 30 mol % carboxylic acid groups.

In the compositions of the present invention the hydrophobically associating polymer will be present in the range from about 1,000 to about 25,000 parts by weight per million parts of water.

The anionic and nonionic surfactants suitable in the practice of the present invention include alkali metal salts of alkyl sulfates having from about 6 to 22 carbon atoms in the alkyl group, alkali metal salts of alkylethyoxy sulfates having from about 6 to 22 carbon atoms in the alkyl group and having about 3 to 50 ethoxy groups, and alkyl ethoxylates having from about 6 to 22 carbon atoms in the alkyl group and having from about 3 to 50 ethoxy groups. In the above surfactants the preferred alkali metal is sodium.

The surfactants are present in the composition of the present invention in the range from about 25 parts by weight to about 7,500 parts by weight per million parts by weight of water.

The compositions of the present invention also include a salt selected from the group consisting of alkali and alkaline earth metal halides and mixtures thereof. The preferred salt is an alkali metal halide, especially chloride.

The salt is present in amount ranging from about 0.5 to about 4 wt. % based on the weight of water.

In utilizing the compositions of the present invention in decontaminating a hydrocarbon contaminated earth formation it is particularly preferred to first determine the viscosity of the hydrocarbon contaminant as well as to evaluate the permeability of the contamination zone. Then a surfactant flooding composition will be selected for the surfactant flooding operation which has a viscosity substantially equal to or greater than the viscosity of the contaminate.

Compositions can be easily prepared within the range of parameters outlined above, which will have the requisite viscosity. In general, the polymer is first dissolved in the aqueous salt solution. Then the surfactant is added and the components mixed at room temperature.

After formulating the desired composition, the composition is injected into the formation under standard surfactant flooding conditions which will mobilize the contaminant for recovery and treatment.

Examples of polymer-surfactant fluids compositions encompassed by the present invention are given in Table 1. As can be seen fluid viscosities ranging from 17 to about 2,500 centipoise are achievable by the compositions.

TABLE I

| Polymer | Salt Wt % NaCl | Surfactant | Surfactant Conc. (ppm) | Fluid Viscosity @ $1.28s^{-1}$ (cP) |
|---|---|---|---|---|
| P1 | 2.0 | $1\text{-}C_8H_{17}(OCH_2CH_2)_{\frac{m}{5}}OH$ | 400 | 17 |
| P2 | 3.3 | $1\text{-}C_{18}H_{35}(OCH_2CH_2)_{\frac{p}{10}}OH$ | 50 | 66 |
| P3 | 3.3 | $1\text{-}C_{12}H_{25}(SO_4^-Na^+)$ | 2500 | 154 |
| P1 | 2.0 | $br\text{-}C_{12}H_{25}(OCH_2CH_2)_{\frac{p}{7}}OH$ | 100 | 224 |
| P3 | 3.3 | $1\text{-}C_{12}H_{25}(SO_4^-Na^+)$ | 5000 | 241 |
| P1 | 2.0 | $1\text{-}C_{12}H_{25}(OCH_2CH_2)_{\frac{p}{5}}OH$ | 100 | 348 |
| P1 | 2.0 | $br\text{-}C_{12}H_{25}(OCH_2CH_2)_{\frac{p}{5}}OH$ | 50 | 485 |
| P1 | 2.0 | $1\text{-}C_{13}H_{27}(OCH_2CH_2)_{\frac{m}{5}}OH$ | 750 | 561 |
| P1 | 2.0 | $br\text{-}C_{12}H_{25}(OCH_2CH_2)_{\frac{m}{5}}OH$ | 500 | 845 |
| P1 | 2.0 | $1\text{-}C_{12}H_{25}(OCH_2CH_2)_{\frac{p}{6}}OH$ | 25 | 927 |
| P1 | 2.0 | $1\text{-}C_{12}H_{25}(OCH_2CH_2)_{\frac{p}{5}}OH$ | 200 | 1028 |
| P1 | 2.0 | $1\text{-}C_{12}H_{25}(OCH_2CH_2)_{\frac{p}{5}}OH$ | 200 | 1450 |
| P1 | 2.0 | $1\text{-}C_{12}H_{25}(OCH_2CH_2)_3{}^-SO_4^-Na^+$ | 25 | 1534 |
| P1 | 2.0 | $br\text{-}C_{12}H_{25}(OCH_2CH_2)_{\frac{p}{5}}OH$ | 300 | 2128 |

Polymers
P1 = Copolymer of n-octylacrylamide and acrylamide; 1.25 mole % n-octyl content; 18% hydrolysis; 2000 ppm concentration
P2 = Copolymer of n-octylacrylamide and acrylamide; 0.75 mole % n-octyl content; 18% hydrolysis; 1500 ppm concentration
P3 = Terpolymer of n-octylacrylamide, acrylamide and 2-acrylamido-2-methylpropane sulfonate; 0.75 mole % n-octyl content; 2000 ppm concentration
Surfactants
1 = Linear hydrocarbon chain
br = Branched hydrocarbon chain
m = monodisperse ethoxy group
p = polydisperse ethoxy group

What is claimed is:

1. An aqueous composition having a viscosity ranging from about 17 to about 2,500 centipoise for flooding a subterranean formation comprising:
   (a) water;
   (b) from about 1,000 to about 25,000 parts by weight of a hydrophobically associating polymer per million parts by weight of water, the hydrophobically associating polymer being selected from a group consisting of copolymers of a acrylamide with mono and dialkylacrylamides of 4 to about 18 carbon atoms, partially hydrolyzed derivatives of those copolymers, and terpolymers of mono or dialkylacrylamides of 4 to about 18 carbon atoms with acrylamide and one of an ethylenically unsaturated sulfonic acid salt of an alkali metal or ammonia and N-vinyl pyrrolidone;
   (c) from about 25 to about 7,500 parts by weight per million parts by weight of water of one or more anionic or non-ionic surfactants selected from the group consisting of alkali metal salts of alkyl sulfates of from 6 to 18 carbon atoms, alkali metal salts of alkyl ethoxy sulfates having 6 to 18 carbon atoms in the alkyl group and 3 to 50 ethoxy groups; and alkyl ethoxylates groups having from 6 to 22 carbon atoms in the alkyl groups and 3 to 50 in the ethoxy groups; and,
   (d) from about 0.5 wt. % to about 4 wt. %, based on the weight of the water, of salts selected from the group consisting of alkali and alkaline earth metal halides and mixtures thereof.

2. The composition of claim 1 wherein the hydrophobically associating polymer is a partially hydrolyzed derivative of a copolymer of a mono or dialkylacrylamide with acrylamide.

3. The composition of claim 2 wherein the copolymer is hydrolyzed to provide a polymer containing from about 10 mol % to about 30 mol % carboxylic acid groups.

4. The composition of claim 3 wherein the salt is sodium chloride.

* * * * *